United States Patent Office 3,202,617
Patented Aug. 24, 1965

3,202,617
PROCESS FOR PRODUCING A HYDROSILICON POLYMER BASED CATALYST
Eduard Enk and Gottfried Piekarski, Burghausen, Upper Bavaria, and Hellmuth Puchala, Munich, Germany, and Rudolf Kloss, deceased, late of Burghausen, Upper Bavaria, Germany, by Erika Kloss, Maria Kloss, and Emil Kloss, legal representatives, all of Wurzburg, Germany, assignors to Wacker - Chemie G.m.b.H., Munich, Germany
No Drawing. Filed Apr. 12, 1961, Ser. No. 102,614
Claims priority, application Germany, Apr. 19, 1960, W 27,679
6 Claims. (Cl. 252—429)

This invention relates to a new class of catalysts for the polymerization of unsaturated organic compounds.

The development of catalyst systems for high- and low-pressure polymerization of olefins has accelerated rapidly within the last decade. It has been disclosed that polymerization and copolymerization of olefins and other unsaturated organic compounds including alkynes, can be carried forward at low pressures and temperatures when catalyzed with mixtures of compounds of the metals in groups IVB, VB and VIB of the periodic chart of elements and hydrogen-silicon compounds, in the presence of inert solvents. (See e.g. U.S. patent application Serial No. 777,181, filed December 1, 1958.) It has also been disclosed that an increase in polymerization rate can be achieved by adding Friedel-Crafts type catalysts to such catalyst mixtures. The noted co-catalyst masses are effective in polymerizing olefins but have several deficiencies. The molecular weight of the polymeric product is not controlled and is not reproducible from batch to batch. Even in a continuous polymerization system the co-catalysts give products displaying a wide variety of molecular weights and sizes. Furthermore, the known catalyst mixtures often provide a low polymerization rate.

It is the object of this invention to introduce a novel catalyst system for polymerizing and copolymerizing unsaturated organic compounds. A catalyst mass providing a greatly increased polymerization rate is also an object of this invention. Another object is a catalyst mass which can be employed to produce polymers of standard and reproducible molecular size. Another object is a catalyst mass useful in polymerizing olefins to obtain linear polymers of high purity and containing a minimum of side chains. Other objects and advantages accruing from this invention are detailed in or will be apparent from the disclosure and claims.

The catalysts prepare and employed in accordance with this invention consist essentially of (1) a hydrogen-silicon polymer consisting essentially of units of the formula

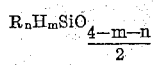

where each R is a monovalent hydrocarbon radical or a halogenated monovalent hydrocarbon radical, $n$ is 0 to 2, $m$ is 1 to 3, (2) a compound of a metal in group IIIA of the periodic chart, i.e., boron, aluminum, gallium, indium or thallium and (3) a compound of metal of group IVB, VB, VIB, VIIB or VIII of the periodic chart. The hydrogen-silicon polymer and the compound of group IIIA metal are mixed and heated to 10° to 200° C. The reaction product so obtained is then heated with the metal compound of groups IVB to VIII of the periodic chart until a finely divided catalyst suspension is obtained. It is preferred to carry forward the noted reaction in an inert organic solvent.

The catalysts of this invention are operative for the polymerization of olefins, aliphatic vinyl compounds, vinyl aromatic compounds and vinylcycloaliphatic compounds. Thus the following are examples of the monomers polymerized with these catalysts: ethylene, propylene, butene-1, hexene-1, heptene-1, octene-1, dodecene-1, isobutylene, $CH_2=CHC_xH_{2x+1}$ where $x$ is an integer, vinyl chloride, vinyl acetate, acrylic acid derivatives, styrene, styrene derivatives as α-methyl styrene, vinylcyclohexane, and so forth.

The hydrogen-silicon polymers employed herein contain 10 to 100 mol percent of units of the formula

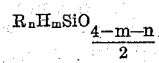

In this formula, each R is a monovalent radical selected from hydrocarbon and halogenohydrocarbon radicals, for example, alkyl radicals such as methyl, ethyl, propyl, butyl and octadecyl; cycloalkyl radicals such as cyclopentyl, cyclohexyl and cyclooctyl; aryl radicals such as phenyl, diphenyl and anthracyl; alkaryl radicals such as tolyl, xylyl and methylnaphthyl; aralkyl radicals such as benzyl and phenylethyl; alkenyl radicals such as vinyl, allyl, octadecenyl and methallyl; and halogenated derivatives of the foregoing radicals such as chloromethyl, bromomethyl, perfluoroethyl, chlorophenyl, α,α,α-trifluoromethylphenyl, 3,3,3 - trifluoropropyl, bromobenzyl, and chlorofluorovinyl radicals. The operative polymers can contain up to 90 mol percent of other siloxane polymer units selected from $SiO_{4/2}$, $RSiO_{3/2}$, $R_2SiO$ and $R_3SiO_{1/2}$ units where R is as above defined. The operative hydrogensilicon polymers can be cyclic polymers such as $(CH_3HSiO)_x$ where $x$ is 3 to 10. The hydrogensilicon polymers can also be linear materials such as $R(CH_3HiSO)_ySiHCH_3R$, where $y$ is 1 to 120. Mixtures of various of the defined cyclic siloxanes and/or the defined linear siloxanes can be employed and such mixtures are the normal commercial materials. The operable polymers are fluids. Because of commercial availability and simplicity of operation the methylhydrogensiloxanes are preferred for use in this invention. However, other hydrogensilicon polymers are useful such as a copolymer of 80 mol percent $CH_3SiO$ units, 15 mol percent $(C_6H_5)_2SiO$ units, .5 mol percent $(CH_3)_3SiO_{1/2}$ units, 3 mol percent $(CH_3O)HSiO$ units, and 1.5 mol percent

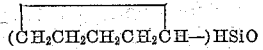

units. Other siloxane units typically present are

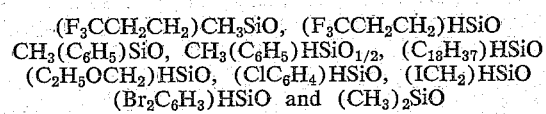

units. Thus the operative siloxanes are homopolymeric and copolymeric, cyclic and linear siloxanes containing 2 to 120 silicon atoms wherein at least 10 percent of the silicon atoms have hydrogen bonded directly thereto, any other organic radicals bonded directly to Si being monovalent radicals selected from hydrocarbon and halogenohydrocarbon radicals.

The silicon polymer is reacted with a compound of a metal in group IIIA of the periodic chart of elements. There metals are boron, aluminum, gallium, indium and thallium. The metal compounds employed are halides, alkoxides, halogen alkoxides, aryloxides, halogen aryloxides, addition compounds and trialkylsiloxy metal halides. The preferred compound is $AlCl_3$ but other operative compounds include $Al(OR')_4$ where R' is a monovalent aliphatic hydrocarbon radical, $Al_2Cl_5$, $R'_3SiOAlCl_2$, $AlBr_3$, aluminum isopropylate, $GaCl_3$, boron halides such as $BBr_3$, $B_2H_5Br$, $BBrI_2$, $BCl_3$, $BF_3$, $BI_3$, $AlCl_3\text{-}TiCl_3$ addition complexes, addition compounds of the enumerated halides and alkyl halides, $(C_2H_5O)_2BCl$, $(C_5H_{11}O)_2BCl$, $(CH_3O)_2BH$
$B_2H_4(CH_3)_2$, $[(CH_3)_2B]_2O$, $C_6H_5BCl_2$
$(C_6H_5O)_3B$, $B(C_3H_7)_3$, $(CH_3)_2BBr$ and corresponding compounds of Ga, In and Tl.

The silicon compound and compound of group IIIA are mixed in proportion of 1 mol polysiloxane unit per .001 to 10, preferably .01 to 1, mol of the compound of group IIIA. The mixture is heated at 10° to 200° C. It is preferred to mix these materials and carry out the reaction in an inert solvent. During the reaction, the reactants go into solution and only the impurities present in the group IIIA metal compound remain undissolved. Very pure group IIIA metal compounds will give little or no undissolved residue and the reaction mass in solution can be immediately further reacted with the metal compound of the groups IVB to VIII of the periodic chart. However, the undissolved materials can easily be separated by filtration or merely careful decanting of the supernatant liquid.

The reaction products of the hydrogen silicon compounds and group IIIA compounds can be stored for an indefinite period so long as moisture is excluded. The reaction products are converted to the final catalyst mass by a further reaction with a compound of a metal of groups IVB, VB, VIB, VIIB or VIII of the periodic chart of elements. These metals include Ti, Zr, Hf, Th, V, Cb, Ta, Pa, Cr, Mo, W, U, Mn, Ma, Re, Fe, Ru, Os, Co, Rh, Ir, Ni, Pd and Pt.

The operative compounds of metals of groups IVB to VIII are the halides, oxyhalides, oxyhalogen alkoxides, alcoholates, acetates, acetyl acetonates and halogen-containing metalorganic cyclopentadienyl compounds. Examples of the operative metal compounds are $TiCl_4$, $ZrCl_4$, $VCl_4$, $CrCl_3$, $MoCl_5$, $HfCl_4$, $WCl_5$, $FeCl_3$, $CoBr_2$, $CoBr_2 \cdot 6H_2O$, $CoCl_2$, $CoCl_2 \cdot 6H_2O$, $CoCl_3$, $CoF_2 \cdot 2H_2O$, $CoF_3$, $CoI_2$ isopropoxy titanium trichloride, zirconium oxychloride, vanadium oxytrichloride, vanadium oxychloride alkoxides [e.g. $V_2OCl_3(OCH_3)_3$], molybdenum alkoxychlorides [e.g. $MoCl_3(OC_2H_5)_2$], chromium oxychloride, $Ti(OR''_4)$, $Zr(OR''_4)$ where $R''$ is alkyl or aralkyl, titanium dichlorodiacetate, Zr-tetraacetate, Zr-, Th-, Co- and Cr-acetylacetonates, dichloro- and monochloro-bis-(cyclopentadienyl) compounds of Ti, Zr, V and Cr and cyclopentadienyl titanium trihalides. Also operative are titanium oxychlorides, isopropoxy zirconium tribromide, hafnium oxychloride, $HfF_4$, $HfCl_4$, $HfOBr_2$ hafnium acetyl acetone, thorium fluoride, thorium oxyfluoride, thorium chloride, thorium formate, thorium acetate, vanadous chloride, $VF_3$, $VCl_3$, vanadyl chloride, $VCl_4$, vanadyl difluoride, $VDCl_3$, $VF_5$, tantalum pentafluoride, tantalum oxyfluoride, $TaCl_4$, $TaOBr_3$, $WF_6$, $WCl_6$, $WO_2Cl_2$, $WOCl_4$, $UF_6$, $U_2F_9U_4F_{17}$, uranium chlorides, $U(CF_3COCHCOCH_3)_4$, $U(CF_3COCHCOCF_3)_4$, $MoF_6$ molybdenum chlorides, molybdenyl chloride, nickel acetate, $NiBr_2$, $NiCl_2$, $NbCl_3$, $NbOF_3$, $NbCl_5$, $NbOCl_3$, iridium chloride, iridium fluorides, iron halides, managanous acetate, $MnCl_2$, $MnCl_3$, platinum fluorides, chloroplatinic acid, platinum iodides, palladium chlorides, ruthenium chlorides and fluorides, osmium chlorides and fluorides, $RhCl_3$, $RhF_3$, rhenium-chlorides-fluorides, -oxy bromide, -oxy chloride and corresponding compounds of the metals of groups IVB through VIII of the periodic chart of elements.

The compounds of the metals of group IVB through VIII of the periodic chart are employed in quantities of .02 to 2.0, preferably .05 to 0.5, mols per mol of polysiloxane unit employed. The proportion of metal compound of groups IVB through VIII can vary from much less to a large molar excess when compared to the proportion of compound of group IIIA present in the catalyst mass.

The preparation of the catalyst is preferably carried out in the presence of an inert solvent. Operable solvents include saturated aliphatic hydrocarbons such as n-pentane, n-heptane, isooctane, ligroin and other paraffin hydrocarbons such as benzine, cycloaliphatic and aromatic hydrocarbons such as cyclohexane, benzene, and xylene. Halogenated aliphatic and aromatic hydrocarbons such as trichloroethylene, perchloroethylene, bromobenzene and chlorobenzene are also useful but such solvents are employed in minimum quantities such that the heat of reaction is suitably dispersed and the products are completely in suspension.

The presence of hydrogen halide and particularly hydrogen chloride, in the solution during preparation of the catalysts, accelerates the formation of the catalyst. The hydrogen halide is easily removed from the catalyst mass by repeated evacuation in the catalyst preparation vessel or in the polymerization vessel.

The preparation of the catalyst can be carried out in the presence of finely divided solid carrier substances such as synthetic organic resins, e.g. polyethylene, polypropylene and polystyrene and inert inorganic materials, e.g. NaCl, silicas and carbon black. The type and amount of solid carrier employed will depend upon the ultimate uses for the polymer to be produced. The amount of carrier is limited only in that the suspension of solid carrier in the catalyst solution must remain stirrable. The carrier material can be added at any time during the preparation of the catalyst. The carrier can be added in one portion or in several separate portions. It has been found to be advantageous to add the carrier material to the hydrogen silicon—group IIIA reaction product and suspend the carrier material in the reaction product for about one hour before carrying out the further reaction with the metal compounds of groups IVB to VIII.

The activity of the catalysts of this invention can be further enhanced by time and temperature aging. The catalyst can be heated moderately before use and thus its activity is increased. Furthermore, the catalyst can be dissolved in inert organic solvent if produced in a solventless reaction or it can be further diluted with additional solvent if produced in a solvent medium. The catalyst may be further diluted at any point during the polymerization reaction.

The catalysts of this invention are obtained in a finely divided state and in solution. Thus careful control of the amount of catalyst employed in the polymerization reaction is readily accomplished. Furthermore, the addition of catalyst during the polymerization is a simple matter and spent catalyst can be removed from the reaction zone simply by draining off the solution.

The catalysts of this invention are very active as olefin polymerization catalysts in atmospheric, low temperature polymerization (i.e. 10°–20° C.). The catalysts can also be used at elevated temperatures (i.e. 20°–200° C., preferably 50°–130° C.) and/or elevated pressure (i.e. 10–100 atmospheres or more). These catalysts give good space-time yields of high molecular weight polyolefins. The space-time yield obtained with these catalysts is dependent upon the proportion ratios of each of the three components employed. With the amount of group IVB–VIII compound and hydrogensiloxane held constant and increasing amounts of group IIIA compound, the space-time yield increases linearly to a maximum, then drops off sharply. The proportions of group IVB–VIII compound providing a maximum space-time yield and the range of proportions over which the maximum is achieved are functions of the ratio of the group IVB–VIII compound to hydrogensiloxane in the reaction product. Furthermore, the space-time yields increase with increasing percentages of group IVB—VIII compound in the catalyst mass. Thus holding constant the proportion of group IIIA compound and hydrogensiloxane, the space-time yield increases linearly to a broad maximum plateau and then decreases gradually.

The catalysts of this invention are operative in batchwise polymerizations as well as in continuous polymerization systems. For example, in a pipe system with a circulating pump the catalysts in solution are readily carried through the system. The heat of reaction is easily dissipated. The polymer does not deposit in the pipes and no films are noted in the system even when TiCl₄ is employed.

The polyolefins produced in accordance with this invention are obtained in finely divided form. The polymers produced are obtained in pure white form by washing away the adhering catalyst with an aliphtic alcohol or a mixture of such alcohol and an aliphatic ketone. Preferably a mixture of isopropanol or n-butanol with up to 15 percent by weight of acetone or methyl ethyl ketone is employed in this polymer washing step. The washing step can advantageously be carried forward while the polyolefin product is in the inert organic solvent carrying the catalyst mass. When the washing is accomplished in this manner, the low molecular weight products such as waxes are removed by the washing. This enables the preparation of polyolefins exhibiting ash contents below .01% by weight and containing less than 0.1% by weight of low molecular weight materials extractable with acetone.

The polymers obtained in accordance with this invention are linear polymers remarkably free of side chains and having high softening and melting points. These polymers exhibit excellent heat stability and do not discolor when molded under high pressure-temperature conditions.

The polymers prepared herein are easily miscible with fillers, dyestuffs, lubricants, stabilizers, wetting agents and other additives normally employed in polyolefin plastics. The polymers containing fillers are easily extruded even in the absence of a lubricant. Thus polyolefin dispersions and coatings on metals, glass or paper or insulations on metal wires are readily prepared with the polyolefins of this invention. These polyolefins form pore free, void free coatings on metal surfaces when employed in the vortex-sintering method or the dipping method. Chemical modification such as chlorination, sulfochlorination, introduction of hydroperoxide groups, and so forth can easily be carried forward by standard techniques applied to the polymers of this invention. The polymer powders are particularly useful as carrier materials for catalysts employed in low pressure polymerization of ethylene and propylene.

The following examples are intended to aid those skilled in the art in understanding and practicing this invention. All parts and percentages are based on weight unless otherwise stated. A methyl hydrogensiloxane endblocked with trimethylsilyl units

[Me₃SiO(MeHSiO)ₙSiMe₃]

where Me=methyl] was employed in the examples unless otherwise stated. The examples do not delineate the scope of the invention.

EXAMPLES 1–48

A series of experiments was carried forward under identical and carefully controlled conditions employing a trimethylsilyl endblocked methylhydrogensiloxane of 32 cs. viscosity at 25° C., reacted with AlCl₃ in varying proportions in 50 ml. of a purified, deaerated paraffin hydrocarbon solvent (boiling range 200°–235° C.). The reaction was carried out at 90° C. under nitrogen. The entire mass was in solution within 20 minutes. The insoluble residues, impurities from the AlCl₃, were filtered off and the solution was added to a 1 liter, four-neck flask fitted with stirrer, reflux condenser, gas inlet tube and thermometer. The solution was further diluted by adding 50 ml. of the paraffin hydrocarbon noted above. Sufficient TiCl₄ was added to the solution to give a total of 5.0 g. of siloxane polymer plus AlCl₃ plus TiCl₄. The mass was heated under nitrogen to 90° C. with stirring and a colloidal, dark-colored precipitate formed and rapidly increased in amount. After heating the mass for 20 minutes dried ethylene was introduced into the flask to replace the nitrogen and an additional 100 ml. of the paraffin hydrocarbon solvent was added. The catalyst mixture was heated for three hours at 85° C. at a constant stirring speed and ethylene was added at a rate such that some gas was leaving the equipment at all times. The ethylene absorption remained almost constant during the entire polymerization and additional quantities of a paraffin hydrocarbon solvent were added from time to time. After three hours the catalyst was washed out of the polymeric product with a mixture of 85% by volume isopropyl alcohol and 15% methyl ethyl ketone while the mass was cooling to room temperature. After the mass reached room temperature it was stirred for thirty minutes. The polymeric product was filtered out of the solution and washed with paraffin hydrocarbon solvent containing 1% by volume of the 85–15 mixture of isopropanol and methyl ethyl ketone. After washing, the polymer was dried by heating at 80° C. and a very fine grained polyethylene of 2–3 micron particle size was obtained. The powder melts at 127°–134° C. as measured under a polarization microscope. The results are tabulated in Table I.

Table I.—Dependence of the catalyst activity, expressed in grams of polyethylene yield, upon the AlCl₃/TiCl₄/polysiloxane mol ratio

| Example No. | 1-6 | 7-15 | 16-23 | 24-31 | 32-40 | 41-48 |
|---|---|---|---|---|---|---|
| Mol ratio AlCl₃:polysiloxane: | Mol ratio TiCl₄:polysiloxane | | | | | |
| | 0.033 | 0.133 | 0.199 | 0.232 | 0.332 | 0.57 |
| 0 | 0 | 0 | 0 | 0 | 0 | 0 |
| 0.045 | | 27.8 | | | 43.2 | |
| 0.09 | 6.3 | 33.6 | 54.2 | 67.7 | 82.5 | 73.1 |
| 0.135 | | 54.0 | 91.8 | 93.9 | 101.8 | 91.5 |
| 0.18 | 10.2 | 62.5 | 81.5 | 84.0 | 85.9 | 83.9 |
| 0.225 | 14.4 | 69.1 | 85.6 | 86.5 | 86.0 | 64.2 |
| 0.27 | | 51.8 | 62.7 | 69.6 | 51.9 | 32.0 |
| 0.315 | 0.9 | 2.4 | 3.6 | 2.3 | 2.0 | 1.5 |
| 0.36 | 0 | 0 | 0 | 0 | 0 | 0 |

The yields noted in Table I can be further increased by using higher stirring speeds and/or a longer period of polymerization.

EXAMPLE 49

A catalyst is prepared from the methylhydrogensiloxane, AlCl₃ and TiCl₄ whereby the material amounts used and the mol ratios correspond to Example 35. However, to the filtered solution from the reaction of polysiloxane and AlCl₃, in which only 30 ml. of dilution agent are used instead of 50 ml., there are added 5 g. of most finely pulverized, dry and deaerated polyethylene and the solution is thoroughly agitated for 10 minutes at 50° C. Then one dilutes further with 70 ml. paraffin hydrocarbon and one proceeds as in Example 35. The product obtained is 114.5 g. of white polyethylene powder: melting point 131°–132° C.

EXAMPLE 50

A catalyst is prepared and polymerization is carried forward as described in Example 49, however dried and purified ethylene is used as protective gas instead of nitrogen. A further increase in yield is recorded. The product is 133.0 g. of polyethylene whose properties agree with those of the products mentioned in the preceding examples.

EXAMPLE 51

Example 35 was repeated under ethylene gas rather than nitrogen protection in the catalyst preparation. The product obtained is 120.7 g. of white polyethylene, melting point 130.5°–131° C.

EXAMPLE 52

Employing the mol ratio of the three components as reported in Example 18, the catalyst suspension in 100 ml. ligroin is stirred for another ½ hour at 85° C. and, after dilution with a further 100 ml. of ligroin, for still another hour at the same temperature. After adding again 100 ml. of solvent, the catalyst solution is evacuated briefly three times (150 mm. Hg) whereby normal pressure is restored each time with ethylene. Ethylene polymerization and working-up is carried out as in Example 18. The product is 125.5 g. of fine-grained white polyethylene powder; particle size between 1 and $3\mu$, melting point 132° C., molecular weight 90,000 (the molecular weight was determined viscosimetrically in decalin at 135° C. and calculated as per H. Wesslau, Kunststoffe 49,330, 1959). The polyethylene prepared under Example 18, without dilution aging had a molecular weight of 61,000 measured in the same manner.

EXAMPLE 53

10 ml. of methylhydrogen polysiloxane as in Example 1, and 3 g. $AlCl_3$ are reacted in 100 ml. of ligroin (boiling point 70°–85° C.) while stirring and heating to 90° C. Except for slight residues, almost everything has gone into solution after 22 minutes. The mass is filtered under exclusion of moisture and the solvent evaporated under vacuum (10 mm. Hg). There remains a mobile, almost colorless oil, whose viscosity hardly differs from the methylhydrogen polysiloxane used. The Al/Si ratio is determined in the oil analytically and then so much of it is withdrawn that after dilution with 100 ml. of paraffin hydrocarbon with a boiling range of 90°–140° C. and after addition of $TiCl_4$ at a $TiCl_4$/polysiloxane mol ration of 0.33 there are available altogether 5 grams of the three components for the preparation of catalyst. A dark, black-brown catalyst suspension is formed already upon heating under nitrogen, which scarcely increases in amount after a 3-hour reaction period at 90° C. After dilution with another 200 ml. of hydrocarbon and brief stirring one can store the very finely divided suspension indefinitely, with exclusion of air and moisture. Before use, one can easily suspend the catalyst, which settles out only slowly, again by means of a stream of inert gas. This catalyst suspension can also be directly pushed through openings with an internal diameter of less than 1 mm. Half of the catalyst suspension prepared above after three months storage and a short period of blowing-through purified nitrogen is pressured into a 0.75 liter autoclave, a further 250 ml. of hydrocarbon solvent are added and, after pressuring to 10 atmospheres absolute with ethylene, polymerized at this pressure and 65° C. The polymerization starts at once moderately exothermic. Through corresponding valve-positioning one sees to it that fresh ethylene gas flows through continually; thereby, it is striking that the ethylene absorption occurs particularly uniformly. Only increased difficulty in stirring ends the polymerization after 5 hours. One decomposes the catalyst, after releasing the pressure, in the autoclave with 150 ml. of benzine containing 5% (vol.) of a mixture of 90 vol. parts of isobutyl alcohol and 12 vol. parts of acetone and stirs briefly. After removal of the polymer material with a further 200 ml. of solvent mixture, one filters on a suction filter, washes with a little of solvent mixture and dries at 80° C. The product is a pure white, fine powder, 125 g., melting point 131.5° C., acetone-extractable lower molecular portions: 0.08%.

EXAMPLE 54

5 ml. of the methylhydrogen polysiloxane of Example 1 were made to react with 2 g. of distilled Al isopropylate by brief heating to 85° C. There results a colorless, fairly viscous oil. This oil is taken up with 50 ml. of ligroin (boiling point 80°–90° C.) and mixed with 1.2 ml. $TiCl_4$. Upon heating there precipitates at 50° C. a finely divided, dark-brown catalyst, the amount of which increases very rapidly. Appropriately, one dilutes with more ligroin to maintain the catalyst in suspension. When one works under too concentrated conditions, gelatinous precipitates may be formed. Both the gelatinous as well as the suspended catalysts dissolve in butyl alcohol clearly with a dark blue-violet color. The finely dispersed catalyst obtained is used in a polymerization vessel for the polymerization of ethylene at normal pressure. After a 4-hour polymerization duration and working-up as in Example 1, 39.8 g. of white polyethylene powder is obtained with a melting point of 133.2° C.

An analogous polymerization course with non-pretreated polysiloxane does not show any catalyst formation; the latter is initiated only after much longer heating, a higher temperature and in a substantially smaller amount.

EXAMPLE 55

500 mg. of sublimed $AlCl_3$ is reacted with 2 ml. of the methyl hydrogen polysiloxane of Example 1 in 40 ml. of paraffin hydrocarbon with the boiling range 90°–140° C., at 100° C., while stirring. Without filtration 150 mg. of sublimed $FeCl_3$ and 0.5 ml. $TiCl_4$ is mixed with it and one heats to 110° C. A catalyst of dark brown-violet color is formed in a large amount. Appropriately, a further amount of auxiliary liquid is added during the last phase of the catalyst formation. The catalyst dissolves clearly with a dark-violet color in deaerated butanol. An ethylene polymerization at normal pressures and under conditions as they are described in Examples 1–48 gives 78 g. of white polyethylene powder. When no $FeCl_3$ is used but only 1.05 g. of $TiCl_4$ the yield is 69.5 g. of polyetheylene.

EXAMPLE 56

From a reaction solution which is obtained from 5 ml. of methyl hydrogen polysiloxane as in Example 1 and 2.0 g. of $AlCl_3$ and 100 ml. benzine (boiling point 110°–150° C.), one prepares with 1.2 ml. of vanadium oxychloride at 90° C. a catalyst which appears in finely divided form and a dark-green color and is sufficiently active to polymerize ethylene by the "single gas" method to a high-molecular solid substance with a melting point of 133.5° C. When one uses distilled Al isopropylate instead of $AlCl_3$ then about the same test results are obtained, however, the catalyst has a slightly lower activity for the polymerization of the ethylene. Comparison experiments under identical conditions with methyl hydrogen siloxane which has not been activated allow one to recognize that both the catalyst formation (bright-green, little) as well as the polymerization of the ethylene proceed substantially more slowly.

EXAMPLES 57–58

2 ml. of the methyl hydrogen polysiloxane as above, and 0.23 g. of $AlCl_3$ in 30 ml. of paraffin hydrocarbon (boiling point 200°–232° C.) are reacted at 90° C; one filters and forms with 0.6 ml. $TiCl_4$ a catalyst at 87° C. for 20 minutes under ethylene protection, then one dilutes with an additional 200 ml. of paraffin hydrocarbon, heats briefly at 75° C. and pressures the catalyst suspension into a 1 liter stirred-autoclave. One polymerizes with purified and dry ethylene at 10 atmospheres absolute and 80°–85° C. Another 150 ml. of paraffin hydrocarbon are added during the polymerization. After catalyst decomposition and working-up, as described in the preceding experiments one obtains at a space-time yield of 53 g./hr./l., 161.4 g. of white polymer powder; molecular weight 60,000, ash content 0.01%.

A control analogous experiment under identical conditions while carrying out a dilution, aging after the catalyst preparation, whereby after the first preparation phase (30 ml., 20 min.) one dilutes with 50 ml. of the solvent and stirs another 30 minutes, then one dilutes and heats as reported above and allows to age one night at normal temperature, shows a substantial molecular weight increase to 120,000 for a yield of 157.8 g. and a space-time yield of 66.7 g./hr./liter; ash content 0.009%.

EXAMPLE 59

Through a reaction of 10 ml. methyl hydrogen polysiloxane of 50 cs. viscosity at 25° C. and 3 g. AlCl$_3$ at 90° C. in 100 ml. of benzine and subsequent filtration one prepares a solution, dilutes with a further 200 ml. of benzine, pressures the solution into a stirrer-autoclave, heats to 85° C. and pressures with ethylene to 10 atmospheres absolute. No pressure decrease is observed; a pressure increase to 50 atmospheres absolute and/or temperature variation between 50° and 150° C. also do not show an observable ethylene absorption. After cooling-down and opening of the autoclave there is no solid polymer product.

The same mixture in which there are used 3 ml. of TiCl$_4$ instead of the polysiloxane shows that the AlCl$_3$ dissolves in benzine only to a very small extent (about 5%). Without filtration the AlCl$_3$ suspension is used for the polymerization as described above. No solid polymer product is obtained.

EXAMPLE 60

In general, one operates as described in Example 57 but one adds at the same time with the TiCl$_4$ also 0.5 g. of finely powdered, violet TiCl$_3$. The catalyst formation occurs very rapidly and abundantly whereby it is remarkable that the TiCl$_3$ obviously enters into the reaction and goes over into the dark-brown catalyst color. Preparation of the catalyst at 89° C. for 15 minutes. 145 g. of polyethylene are obtained whereby the polymer product in this example occurs in flakes and fibers evidently under the influence of the TiCl$_3$ used. For purposes of processing one, therefore, suitably interposes a mechanical disintegration step in benzine suspension, e.g. in a Star mixer. Melting point 132.5°–134° C., molecular weight 85,000.

EXAMPLE 61

In a first reaction one prepares a solution from 4 ml. of the methyl hydrogen polysiloxane of Example 59 and 0.43 g. of technical AlCl$_3$ in 50 ml. of ligroin (boiling point 70°–80° C.) at 80° C. and subsequent filtration, one mixes same rapidly with 1.2 ml. of TiCl$_4$, and prepares under ethylene protection at 88° C. for 15 minutes a catalyst which one dilutes with 200 ml. ligroin for the polymerization of the ethylene in a 1 liter stirred-autoclave. One polymerizes at 70° C. and 10 atmospheres absolute, whereby after 30 minutes 200 ml. of ligroin is added and again after another 16 minutes. The polymerization is uniformly isothermic and a strong ethylene absorption is still evident after stopping of the stirrer so that one still can polymerize for a prolonged period without stirring. After depressuring and cooling down the autoclave is completely filled with polymer product which is purified in a Star mixer with benzine-alcohol-ketone mixture. 297.5 g. of pure white powder in a space-time yield of 43.2 g./hr./l. melting point 130.5° C. No film formation was observed in the autoclave.

EXAMPLE 62

One prepares in the first reaction stage a solution from 841 mg. AlCl$_3$ and 2.81 ml. methyl hydrogen polysiloxane of 50 cs. viscosity at 25° C. in 100 ml. of benzine (boiling range 110°–150° C.) by heating and then one adds to it 1.68 ml. of TiCl$_4$ and 0.54 ml. of VOCl$_3$. After 20 minutes at 87°–89° C. there has formed a black catalyst suspension under dry nitrogen. This catalyst polymerizes ethylene under normal pressure or pressures up to 10 atmospheres absolute to very high molecular polyethylenes (molecular weights above 400,000).

EXAMPLE 63

From 2 ml. of methyl hydrogen polysiloxane of 50 cs. viscosity at 25° C., 0.2 g. of AlCl$_3$ and 1.2 ml. of TiCl$_4$ one prepares in 50 ml. of paraffin hydrocarbon (boiling point 90°–140° C.) a catalyst as in Example 61 and 500 ml. of solvent are added. After heating to 75° C. one evacuates briefly 3 times (150 mm. Hg) and then the catalyst suspension is pressured into a 1 liter stirred-autoclave. One polymerizes ethylene at 9 atmospheres absolute and 70°–75°. One observes a very uniform exothermic reaction in this experiment, obviously conditioned by the large dilution. The product is 182.5 g. of white powder, at a space-time yield of 30 g./hr./l., melting point 132.3° C., molecular weight 80,000; aceton-extractable wax 0.08%. The polymerization mixture is reproducible, i.e. the yields and the properties of the polymer product remain essentially unchanged. On the contrary, when one prepares from the three components a catalyst without a separated reaction course for 15 minutes at 88° C. in the polymerization vessel, then there is obtained, under otherwise equal conditions, only 102 g. of polyethylene with a molecular weight of 46,000 and wax portions of 0.42%. A further substantial worsening of the yield occurs when the catalyst preparation is undertaken as a single-stage reaction course in 550 ml. of paraffin hydrocarbon; only 11.3 g. of polyethylene with a high ash content are isolated.

EXAMPLE 64

Catalyst preparation in 2 reaction phases from 1.3 ml. of the methyl hydrogen polysiloxane, 0.385 g. of AlCl$_3$ and 0.76 ml. TiCl$_4$ in 25 ml. of paraffin hydrocarbon (boiling point 200°–230° C.) at 87° C. for 16 minutes under ethylene protection; the polyethylene formed thereby serves as catalyst carrier. After dilution with an additional 225 ml. of paraffin hydrocarbon one heats to 75°., the mixture is pressured into 1 liter stirred-autoclave and polymerization is carried out at 83° C. with ethylene at 10 atmospheres absolute. Addition of 2 x 200 ml. of solvent during the polymerization. 146.7 g. of polyethylene in a space-time yield of 40 g./hr./l.; molecular weight 37,000.

EXAMPLE 65

225 ml. of the methyl hydrogen polysiloxane is reacted with 64.5 g. of technical AlCl$_3$ in 4 liters of paraffin hydrocarbon (boiling range 90°–140° C.), while stirring. A slight amount of undissolved residue is filtered off on quartz wool and rinsed out with 0.2 liter of solvent. Then 110 ml. TiCl$_4$ are added under ethylene protection and heated whereby the catalyst begins to drop out at 65° C. The temperature is kept for 35 minutes between 85° and 100° C., then 40 minutes at 75°–80° C. After addition of an additional 5 liters of solvent the catalyst suspension is cooled gradually from 75°–60° C. 1.6 liters of it are removed for other experimental purposes and the main quantity is transferred by pressure into a 150 l. stirred-autoclave, into which 100 l. of dispersion agent has been introduced. Ethylene is polymerized at 10 atmospheres absolute and 75° C., whereby some more paraffin hydrocarbon is added during the polymerization. After 6 hours 40 minutes, the ease with which the polymer suspension formed can be stirred is already encroached upon. After cooling down and expansion 15 l. of benzine are added for dilution and then the polymer slurry is fed continuously into a centrifuge through a pipe system. Thereby, there is also being added continuously about the same amount by volume of decomposition liquid or washing liquid, consisting of paraffin hydrocarbon with 3.5 vol. percent of isopropyl alcohol which contains 15% of acetone. Furthermore, with the above washing liquid one washes continuously on the centrifuge. After drying, the polmer product is obtained as a pure white powder with an ash content below 0.01% and below 0.1% for the acetone-extractable portion. The product is 29.4 kg. of polyethylene in a space-time yield of 30 g./hr./l., melting point 132.2° C., molecular weight 119,000 Vicat (5 kg. load) heat stability 75° C. The sample pressed for the Vicat determination shows no discoloration, whereas a commercial polyethylene sample of comparable molecular weight showed a yellow-brownish discoloration.

When the same mixture is worked up under analogous conditions with a decomposition—respectively washing liquid containing no ketones, then there are found an ash content of 0.08% and acetone-extractable portions of 0.25%.

EXAMPLE 66

A solution is prepared from 5 ml. of methyl hydrogen polysiloxane and 0.5 g. of technical $AlCl_3$ in ligroin (boiling point 70°–80° C.) and filtered, this filtered solution is treated with 3 ml. of distilled butyl titanate and heated under nitrogen protection. A red-brown, fine precipitate is formed which can be used as catalyst for the polymerization of 1-olefins and which dissolves in n-butanol to give a clear dark-blue-violet colored solution.

EXAMPLE 67

5 ml. of methyl hydrogen polysiloxane is made to react with 0.1 g. of $AlCl_3$ in 50 ml. of ligroin (boiling point 70°–80° C.). After filtration it is treated with 100 ml. of a suspension of 1 g. $TiCl_3$ and 0.5 g. $TiCl_2$ in ligroin, which suspension was prepared in a ball mill, and after addition of 0.2 ml. of $TiCl_4$ a catalyst is prepared at 100° C. Liquid propylene is polymerized in a pressure-resistant autoclave at 115°–120° C. with the black cataylst suspension. A viscous, sticky and rubber-like mass is obtained which remains behind as a white, asbestos-like and fibrous product after the catalyst decomposition and good washing-out with alcohol-ketone mixture 15.6% can be extracted with ether; the residue is highly crystalline, melting point 155°–165° C.

EXAMPLE 68

10 ml. of methyl hydrogen polysiloxane are made to react in 200 ml. of benzine (boiling point 90°–140° C.) with 0.5 g. $AlCl_3$ at 90° C. The filtered solution is treated with 1 ml. $TiCl_4$ and a catalyst is prepared at 105° C. for 2 hours. The cooled catalyst suspension is stored one night under exclusion of air and moisture, then diluted with an additional 100 ml. of paraffin hydrocarbon and introduced into an autoclave. 250 g. of distilled and purified vinyl chloride are pressured-in with nitrogen and the polymerization is carried out at 70° C. and 10 atmospheres absolute for 20 hours. After cooling and expansion the catalyst is treated with an n-butanol-acetone mixture whereby the polymer product falls out at once as a white, fine-grained polyvinyl chloride. Yield after filtration and washing on the filter: 140 g.; K-value 57; ash content 0.01%.

EXAMPLE 69

5 ml. of a low viscosity fluid polysiloxane endblocked with trimethylsiloxy groups and containing 54 mol percent of $CH_3SiHO$— units and 45 mole percent of dimethylsiloxane units is allowed to react with 0.8 g. of $AlCl_3$ in 50 ml. of benzine (boiling range 100°–150° C.) and then there is added at 20° C. drop-by-drop 0.5 g. $CrO_2Cl_2$ in 10 ml. of benzine, while stirring well. A dark-brown colloidal solution is formed in an exothermic reaction. At 45° C. there is added additionally 0.4 ml. $TiCl_4$ and a dark-violet-brown catalyst is prepared at 84° C. which is extraordinarily active for the polymerization of ethylene and propylene.

EXAMPLE 70

0.168 g. of $AlCl_3$ are added to a solution of 5 ml. of methyl hydrogen polysiloxane in 95 ml. of purified, $N_2$-saturated benzine of boiling point 100°–140° C. After 2 hours' heating at 80°–90° C. while stirring, 25 ml. of the clear solution is treated with 0.60 ml. of titanium tetrachloride and reacted further for 20 minutes at 90° C. After the formation of the red-brown catalyst suspension one dilutes with 75 ml. of benzine and the temporarily colloidal solution is aged for another 2 hours at 85° C.

At a mol ratio of 3.62:0.05:1.0 (Si/Al/Ti) the amount of catalyst used for the polymerization is 2.33 g. After transfer into the ethylene-flushed, 1 liter glass, pressure-resistant reaction vessel there can be obtained, after a 4½ hour polymerization period at 70°–80° C. and 8–10 atmospheres absolute, 105 g. of purified polyethylene with a molecular weight of 74,000, whereby the total amount of solvent is 0.55 l. benzine at the time of the interruption with isopropanol.

EXAMPLE 71

The catalyst suspension is prepared as in Example 70 whereby the amounts of the solvent used, as well as the temperatures and times are kept the same. The amount of $AlCl_3$ put in is increased to 1.0 g. For a mol ratio of 3.62:0.32:1.00 (Si/Al/Ti) the total amount of catalyst used is 2.54 g. The performance of the polymerization occurs under the same conditions as in Example 70. After a reaction time of 11 hours 110 g. of purified polyethylene of 27,000 molecular weight were obtained, using an amount of benzine of 0.50 liter 90% of the polymerizate is formed during the first hour.

EXAMPLE 72

The performance of the catalyst preparation as well as the polymerization ensue under the conditions of Example 70. The amount of $AlCl_3$ is raised to 3.0 g. The amount of catalyst is 3.04 g. with a ratio of 3.02:1.08:1.0 (Si/Al/Ti). After a polymerization duration of 2½ hours there are obtained 45 g. of purified polyethylene of 32,400 molecular weight using an amount of benzine of 0.3 liter. No further ethylene absorption is found after a reaction time of 1½ hours.

EXAMPLE 73

Using 0.5 g. of $AlCl_3$, the amount of the hydrogen polysiloxane is increased to 10 ml. and diluted with 90 ml. of benzine. The further course proceeds analogous to Example 70. For a mol ratio of 7.0:0.15:1.0 (Si/Al/Ti) the amount of catalyst is 3.66 g. After a polymerization period of 4½ hours, using 0.55 liter of benzine as auxiliary liquid 120 g. of purified polyethylene with a molecular weight of 84,000 can be obtained.

EXAMPLE 74

The amount of $AlCl_3$ used is 6.0 g., whereby under otherwise equal conditions the amounts of polysiloxane were used which were mentioned in Example 73. With a mol ratio of 7.0:2.05:1.0 (Si/Al/Ti) 5.04 g. of catalyst were applied. After a 10½ hour polymerization there are obtained in 0.5 l. benzine 110 g. of purified polyethylene with a molecular weight of 53,300.

EXAMPLE 75

Under the conditions of Example 70, 1.6 g. $AlCl_3$ are made to react with 15 ml. of methyl hydrogen polysiloxane diluted with 85 ml. of benzine. At a mol ratio of 10.0:0.30:1.0 (Si/Al/Ti) and a catalyst quantity of 5.04 g., the yield is 170 g. of purified polyethylene of 156,000 molecular weight, after a polymerization period of 8 hours and with 0.6 l. of benzine.

EXAMPLE 76

The amount of aluminum chloride is increased to 10.0 g. Otherwise the conditions are the same as in Example 75. The catalyst quantity amounts to 7.2 g. for a mol ratio of 10.0:2.45:1.0 (Si/Al/Ti) whereby 150 g. of polyethylene of 42,000 molecular weight in 0.5 l. benzine are obtained after a polymerization time of 2 hours.

EXAMPLE 77

0.766 g. of Al isopropylate are made to react under the conditions of Example 75. 50 ml. of this solution are treated with 1.2 ml. of TiCl₄ and worked up further as in Example 70. The amount of catalyst is 4.98 g. for a mol ratio of 10.0:0.13:1.0 (Si/Al/Ti). After a polymerization time of 2:15 hours in 0.65 l. benzine, 200 g. of polyethylene of 147,000 molecular weight are obtained.

EXAMPLE 78

3.354 g. AlCl₃ are reacted with 11.5 ml. of methyl hydrogen polysiloxane in 10 ml. benzine 20 minutes at 88° C., whereby hydrochloric acid and chlorosilanes are set free. 6.7 ml. of TiCl₄ are added to this solution. After the immediate formation of the brown catalyst precipitate one stirs for 20 minutes at 87° C., after dilution to 100 ml. with benzine the mixture is held at 85° C. for another two hours. The amount of the catalyst used for polymerization is 3.0 g. for a mol ratio of 3.15:0.41:1.0 (Si/Al/Ti). After a polymerization time of 1½ hours under the conditions of Example 70 in 0.5 l. of benzine, 175 g. of purified polyethylene are obtained with an average molecular weight of 68,000.

EXAMPLE 79

1.437 g. AlCl₃ are made to react with 4.82 ml. of methyl hydrogen polysiloxane in 107 ml. of benzine for 40 minutes at 82° C. 1.27 ml. TiCl₄ are added to 50 ml. of this solution and stirred for 20 minutes at 82° C. The brown catalyst suspension which is slowly formed is held at 85° C. for another two hours after additional dilution with 50 ml. of benzine. With the same mol ratio as in Example 78 there are obtained with 3.0 g. of this catalyst, after a polymerization time of 1½ hours under the conditions of Example 70 in 0.5 l. benzine, 80 g. of purified polyethylene of 44,000 molecular weight.

In the Examples 70–79 linear methyl hydrogen polysiloxanes are used with a chain length of 30 silicon atoms.

EXAMPLE 80

1.40 g. of AlCl₃ are reacted with 23.0 ml. of methyl hydrogen polysiloxane containing 6 Si atoms per chain in 10 ml. benzine for 20 minutes at 85° C. and treated with 3.81 ml. of TiCl₄. Otherwise one proceeds further as in Example 78. 50 g. of purified polyethylene with an average molecular weight of 110,000 is obtained with 3.0 g. of this catalyst at a mol ratio of 9.85:0.30:1.0 (Si/Al/Ti) after 4½ hours of polymerization time in 0.25 l. of benzine.

EXAMPLE 81

1.22 g. of AlCl₃ are reacted with 18.0 ml. of methyl hydrogen polysiloxane—100 Si atoms per chain—in 10 ml. of benzine for 20 minutes at 85° C. and treated with 3.32 ml. of TiCl₄; then one proceeds further as in Example 78. 3.0 g. of this catalyst at a mol ratio of 9.85:0.30:1.0 (Si/Al/Ti) give 32 grams of purified polyethylene with an average molecular weight of 93,000 after a polymerization time of 2¾ hours in 0.20 ml. benzine.

EXAMPLE 82

When the method of Example 70 was repeated employing equivalent molar amounts of aluminum butylate, trimethylsiloxy aluminum dichloride, tripropylsiloxy aluminum dibromide, AlBr₃, (C₂H₅O)AlCl, (C₆H₅O)₃Al, C₆H₅OALCL₂, an AlCl₃-TiCl₃ addition complex, boron halides, GaCl₃, (CH₃)₂BBR, (C₂H₅O)₂BCl, (CH₃O)₂BH, B₂H₄(CH₃)₂, [(CH₃)₂B]₂O, C₆H₅BCl₂, B(C₃H₇)₃ and (CH₃)₂BBr in place of the aluminum chloride, equivalent results are achieved.

EXAMPLE 83

When the method of Example 70 was repeated employing equivalent molar amounts of ZrCl₄, VCl₄, CrCl₃, MoCl₅, FeCl₃, FeCl₂, CoBr₂, CoCl₂, CoCl₃, CoF₃, C₄H₉OTiCl₃, Zr(OCl)₄, V₂OCl₃(OCH₃)₃, $$MoCl_3(OC_2H_5)_2$$

alkyl and aryl titanates and zirconates, titanium dichlorodiacetate, zirconium tetra acetate, Zr, Co and Cr acetyl acetonates, dichloro- and monochloro-bis-(cyclopentadienyl)compounds of Ti, Zr, V and Cr, and other halides, oxyhalides, oxyhalogen halides, oxyhalogen alkoxides, aliphatic alcoholates, acetates and acetyl acetonates of Ti, V, Cr, Fe, Co, Ni, Zr, Pd and Pt in place of the TiCl₄, equivalent results were achieved.

EXAMPLE 84

Excellent polymers were achieved when propylene, butene-1, octene-1, vinyl chloride, vinyl acetate, styrene, α-methyl styrene, and vinyl cyclohexane were substituted for the ethylene in the method of Example 70.

That which is claimed is:

1. A process for producing catalysts for polymerization of unsaturated organic compounds consisting essentially of (A) reacting at 10°–200° C. (1) a hydrogensilicon polymer containing 10–200 mol percent of units of the formula $$\frac{R_nH_mSiO_{4-n-m}}{2}$$

and up to 90 mol percent of units of a formula selected from the group consisting of SiO₄/₂, RSiO₂/₃, R₂SiO and R₃SiO₁/₂ where each R is a monovalent radical selected from the group consisting of hydrocarbon radicals and halogenohydrocarbon radicals, $n$ has an average value of 1 to 2, $m$ has an average value from 1 to 2, the sum of $m+n$ is less than 4, there being from 3 to 120, inclusive, silicon atoms in said polymer, with (2) .001 to 1.0 mol per mol of hydrogensilicon units (1) of a compound selected from the group consisting of halides, alkoxides, halogen alkoxides, aryloxides, halogen aryloxides and trialkylsiloxy halides of Al, and thereafter (B) reacting the reaction product from (A) with (3) .02 to 2 mols per mol of hydrogensilicon units of a compound selected from the group consisting of titanium tetrachloride and vanadium oxytrichloride.

2. The process of claim 1 wherein the compounds (A) (2) are employed in amounts of .01 to 1.0 mol per mol of siloxane unit (1) and the compounds (3) are employed in amounts of .05 to .5 mol per mol of siloxane unit (1).

3. The method of claim 2 wherein the compound (2) is an aluminum halide.

4. The method of claim 2 wherein the compound (2) is an aluminum alkoxide.

5. The method of claim 1 wherein the reactions (A) and (B) are carried out in the presence of inert organic solvents.

6. The process of claim 1 wherein the hydrogen-silicon polymer (1) is a methylhydrogensiloxane.

References Cited by the Examiner

UNITED STATES PATENTS 2,938,000   5/60   Wanless et al. _____ 252—429
2,974,133   3/61   Wiberg et al. _____ 252—429 X

FOREIGN PATENTS 573,649   12/58   Belgium.
830,424   3/60   Great Britain.

TOBIAS E. LEVOW, *Primary Examiner.*
JULIUS GREENWALD, SAMUEL BLECH,
*Examiners.*

UNITED STATES PATENT OFFICE
CERTIFICATE OF CORRECTION

Patent No. 3,202,617                                          August 24, 1965

Eduard Enk et al.

It is hereby certified that error appears in the above numbered patent requiring correction and that the said Letters Patent should read as corrected below.

Column 2, line 32, for "$R(CH_3HiSO)_y SiHCH_3R$" read -- $R(CH_3HSiO)_y SiHCH_3R$ --; column 3, line 57, for "managanous" read -- manganous --; column 7, line 31, for "ration" read -- ratio --; column 10, line 33, for "75°." read -- 75° C. --; column 14, line 25, for "10-200" read -- 10-100 --; line 31, for "$RSiO_{2/3}$" read -- $RSiO_{3/2}$ --.

Signed and sealed this 3rd day of January 1967.

(SEAL)
Attest:

ERNEST W. SWIDER                                         EDWARD J. BRENNER
Attesting Officer                                             Commissioner of Patents